April 3, 1928.
J. C. BOYLE
1,665,019
LOCOMOTIVE CAB WINDOW PROTECTOR
Filed Jan. 31, 1927
3 Sheets-Sheet 1
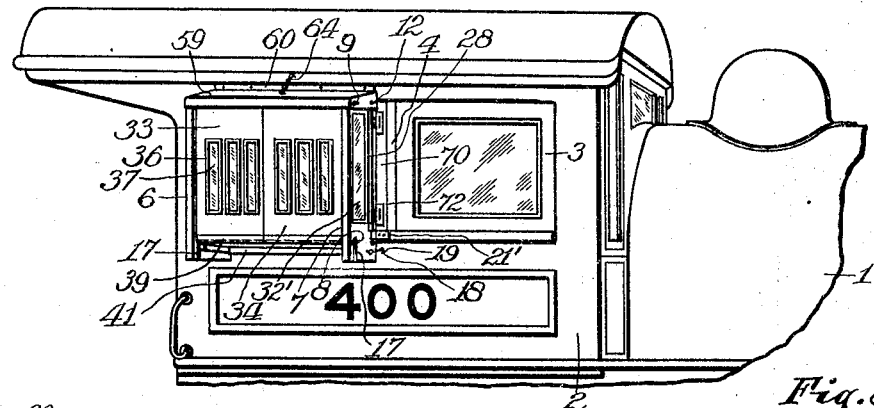
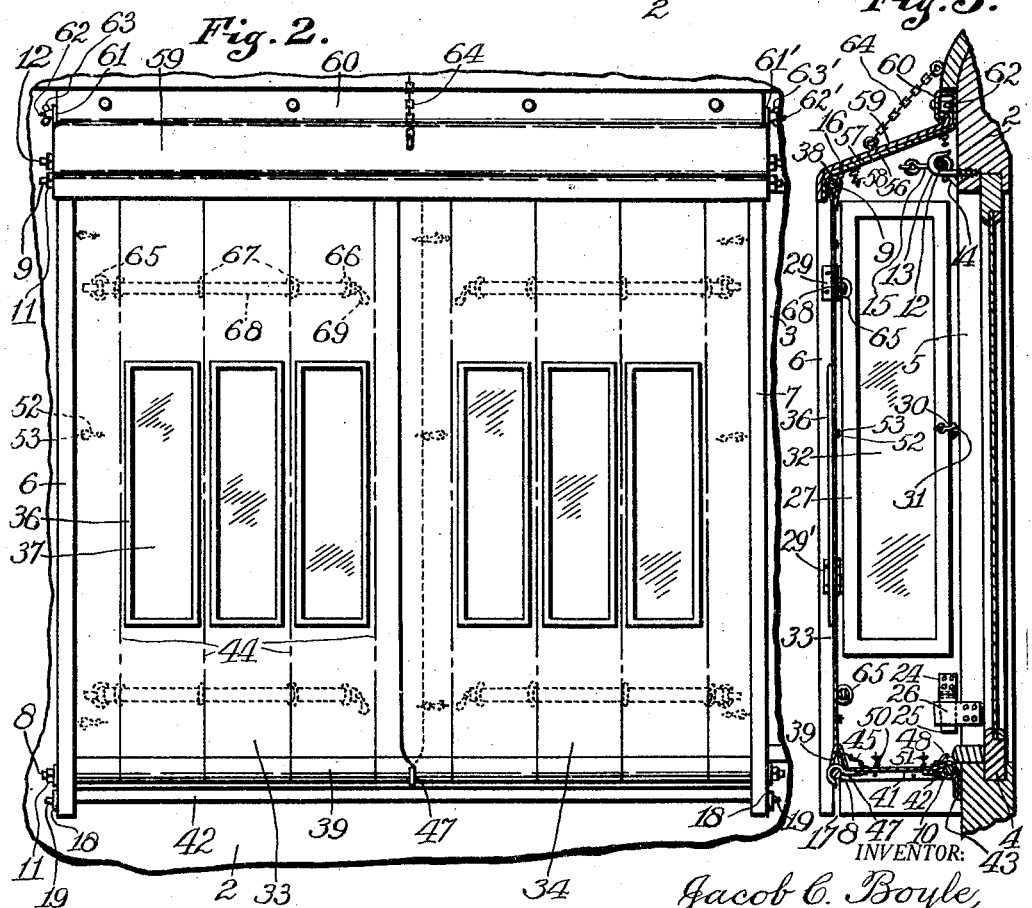
INVENTOR:
Jacob C. Boyle,
BY
E. T. Silvius,
ATTORNEY.

April 3, 1928.  J. C. BOYLE  1,665,019
LOCOMOTIVE CAB WINDOW PROTECTOR
Filed Jan. 31, 1927    3 Sheets-Sheet 2
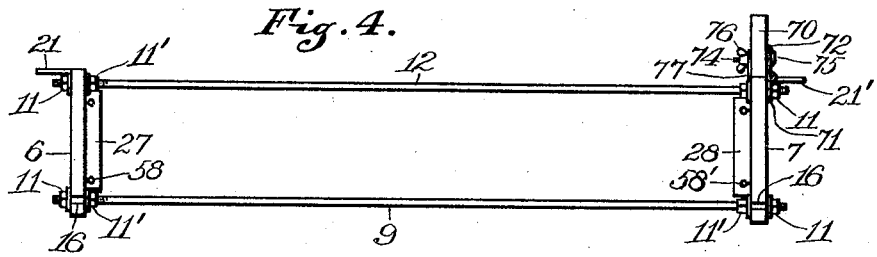
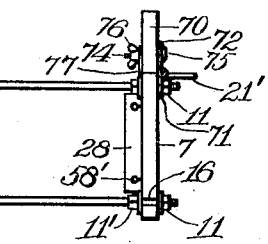
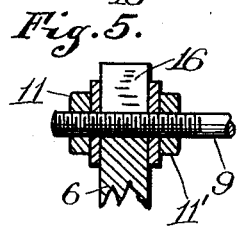
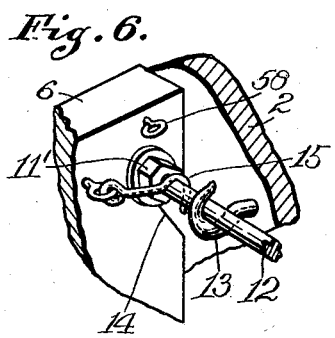
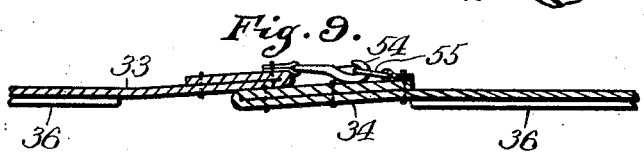
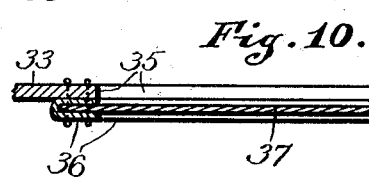
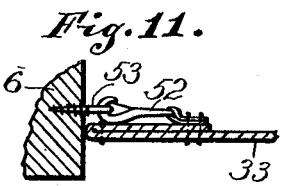
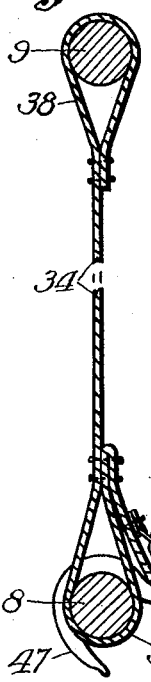
INVENTOR:
Jacob C. Boyle,
BY E. D. Silvius,
ATTORNEY.

April 3, 1928.
J. C. BOYLE
1,665,019
LOCOMOTIVE CAB WINDOW PROTECTOR
Filed Jan. 31, 1927   3 Sheets-Sheet 3
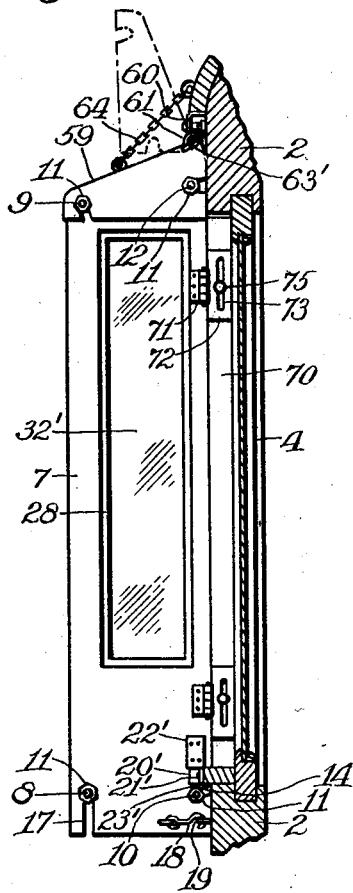
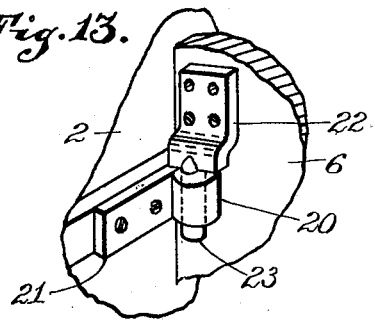
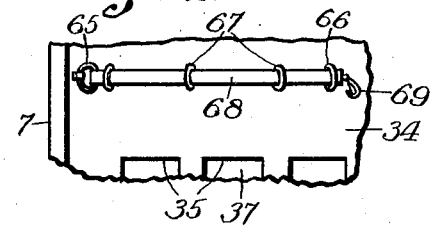
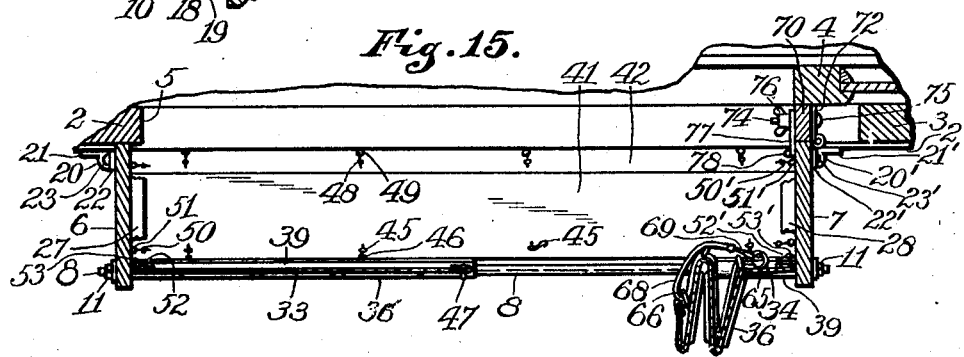
INVENTOR:
Jacob C. Boyle,
BY
E. T. Silvius,
ATTORNEY.

Patented Apr. 3, 1928.

1,665,019

UNITED STATES PATENT OFFICE.

JACOB C. BOYLE, OF INDIANAPOLIS, INDIANA.

LOCOMOTIVE-CAB-WINDOW PROTECTOR.

Application filed January 31, 1927. Serial No. 164,791.

This invention relates to an appliance that is adapted to be attachable to one side of a locomotive cab and protect the window used by the engineer or driver, the invention having reference more particularly to means for guarding locomotive engineers against illness or effects of cold or stormy weather or hot sun rays when operating locomotives.

An object of the invention is to provide an appliance for protection of the health of locomotive engineers when their duty requires them to lean out of the cab window opening.

Another object is to provide a protector to enable a locomotive engineer to lean out of an open cab window to observe signals or for other purposes while being protected from snow or rain and other elements such as strong winds and dust, while affording comfort to the locomotive operator.

A further object is to provide a cab window protector which shall be of such construction as to be adapted to be sectional and portable and also readily attachable to existing locomotive cabs, or to be permanently built onto new cabs.

A still further object is to provide a knock-down locomotive cab window protector of such construction as to permit engineers to individually provide their own protectors for their health and comfort, to be removed from the locomotive cab and cared for by the engineer when not on duty, as in the case of operating different locomotives, which shall be durable and economical in use.

With the above-mentioned and other objects in view, the invention consists in an appliance adapted to afford an off-set window for locomotive cabs, and novel features thereof; and in the novel parts and the combinations and arrangements of parts, as hereinafter particularly described and further defined in the appended claims.

Referring to the drawings,—Figure 1 is a perspective view of a locomotive cab and the window protector thereon; Fig. 2 is a front elevation of the protector and a portion of the cab; Fig. 3 is a transverse section of the protector and portions of the cab; Fig. 4 is a top plan of the protector frame; Fig. 5 is a fragmentary detail of the frame, on an enlarged scale; Fig. 6 is a fragmentary perspective view of co-related parts of the protector; Fig. 7 is a fragmentary perspective view of assembly features; Fig. 8 is a transverse section on an enlarged scale showing the arrangement of flexible parts of the protector; Fig. 9 is a fragmentary horizontal section of the flexible front parts of the protector; Fig. 10 is a fragmentary section on an enlarged scale showing window structure of the flexible front of the protector; Fig. 11 is a fragmentary sectional detail illustrating means to fasten flexible parts to other parts of the protector; Fig. 12 is a forward end elevation of the protector and a fragmentary section of the cab; Fig. 13 is a fragmentary perspective view of means to hingedly secure parts of the protector to a locomotive cab; Fig. 14 is a fragmentary view of the inner side of the flexible front of the protector, and Fig. 15 is a horizontal section of the protector and cab portions in which folding of the flexible front is illustrated.

Similar reference characters in the different figures of the drawings indicate corresponding elements or features of construction herein referred to in detail.

In the drawings the numeral 1 indicates a locomotive boiler and 2 the right-hand side part of the locomotive cab which may be variously constructed and may be wooden or metallic. The side of the cab has windows needed by the engineer for observations, some cabs having two sashes 3 and 4 to slide in suitable guideways, or the forward sash may be stationary, as is understood, and in some structures the window opening may have a post at the rear end of the stationary window sash, permitting the rearward sash to be moved forward to the inner side of the forward sash. In the illustrations the post is omitted and both sashes are movable, the numeral 5 indicating a post portion of the side of the cab defining the rearward end of the window-opening.

The protector as preferably constructed comprises two opposite upright end parts 6 and 7 which may be either wooden or metallic and tied together adjacent to their front edges by means of lower and upper rods 8 and 9, and a lower rear rod 10, each rod being secured at its ends to the end parts by means of nuts 11 and 11', to constitute a protector frame, preferably another rod 12 being similarly secured to the upper rearward portions of the end parts. When it is desired that the protector be temporarily attached to a cab the rod 12 may be removably supported on a plurality of hooks 13 that are secured to the cab above the window-opening; and, to permit the protector parts to be readily disassembled the rod 12 is received into slots 14 cut at an inclination in the rear edges of the parts 6 and 7, the end parts being provided with hooks 15 to engage the rod and retain it in the slots. For like reasons the rod 9 is received into slots 16 in the tops of the parts 6 and 7, said tops preferably being inclined; and the rod 8 is received in slots 17 in the lower end portions of the parts 6 and 7. The lower portions of the protector end parts may be connected to the cab by means of hooks 18 removably connected to screw eyes 19 secured to the cab side 2. For more permanent connection of the protector with the cab the end parts 6 and 7 are hinged to the cab, the cab being provided with hinge ears 20 and 20' having hinge plates 21 and 21' that are secured to the side 2 of the cab, and the end parts 6 and 7 are provided with pivot heads 22 and 22' respectively that are supported upon the ears 20 and 20' and have hinge pins 23 and 23' thereon that are arranged to turn in the ears, preferably being readily removable from the ears. This permits the end parts, when released from the tie rods, to be swung back against the side of the cab to be carried by the cab while the remaining lighter weight parts of the protector are removed; also, if so desired, the protector end parts may be provided with base plates 24 having each a lug 25 projecting downward and into a keeper 26 secured to the side of the cab, instead of the hinging devices, permitting the hooks 13 to be omitted from the protector mountings.

The end parts 6 and 7 have door frames 27 and 28 respectively that are arranged on the inner sides of the parts at suitable doorways therein, each door frame being provided with hinges 29 and 29' arranged adjacent to the front edges of the protector end parts, each door frame being provided with a hook 30 to engage an eye 31 secured to the end part adjacent to its back edge. The door frames have window panes 32 and 32' respectively which may if desired be composed of celluloid, preferably being composed of glass.

The front of the protector is composed of flexible parts 33 and 34, mainly consisting of fabric such as canvas. Each part has a window, or preferably a plurality of narrow windows permitting the flexible part to be rolled or folded, each window having an opening 35, a flexible frame 36 and a flexible window pane 37. The upper end of each fabric front part is connected to the rod 9 and is bodily supported thereby, preferably by means of a wide hem to constitute a loop 38 receiving the rod and permitting the nuts 11 to be drawn through the loop while on the rod. The lower end of each part of the sectional front has a similar loop 39 receiving the rod 8, so that the fabric section is held taut on the rods but may be drawn along the rods and partially folded. The inner side of each flexible part has a horizontal ledge 40 thereon to support one edge of a lower or bottom part 41 which has a loop 42 receiving the rod 10 for support, the loop 42 having a suitable weather strip 43 thereon that projects to the side 2 of the cab. The lines 44 on the flexible front sections indicate the lines on which the sections may be folded.

The floor or bottom part 41 has a suitable number of snap hooks 45 connected to the top thereof to be hooked into rings 46 that are connected to the inner side of the lower portions of the sections or parts 33 and 34 to hold the floor in place. Also a hook 47 is connected to the under side of the floor 41 to be connected to the rod 8 between the sections 33 and 34, so as to hold the floor tightly when the hooks 45 are disconnected to permit the flexible sections to be parted for the convenience of the engineer. A plurality of snap hooks 48 are connected to the back portion of the floor and normally are connected with eyes 49 secured to the side of the cab. One end of the floor 41 is provided with hooks 50 that are connected with eyes 51 secured to the end part 6, the opposite end of the floor being provided with hooks 50' which are connected with eyes 51' secured to the end part 7. One vertical edge portion of the section 33 is provided with hooks 52 that are connected with eyes 53 secured to the inner side of the end part 6, the other section 34 being similarly provided with hooks 52' that are connected with eyes 53' secured to the end part 7. The opposite edges of the sections 33 and 34 overlap and are provided with hooks 54 and co-operating rings 55 secured to the sections respectively to hold the sections together. A flexible roof part 56 is provided and adapted to be secured to the side 2 of the cab above the end parts 6 and 7 and to rest upon said parts to which the roof is secured by means of hooks 57 thereon and eyes 58 secured to the end part 6 and eyes 58' secured to the opposite part 7. The flexible roof is desirable in connection with knock-down protectors.

The protector preferably includes a metallic awning-like roof 59 which is connected to a base plate 60 that is secured to the side 2 of the cab, the roof being turned upward behind the base for shedding water and being provided with ears 61 and 61' hingedly connected to the base by means of bolts 62 and 62' having wing-nuts 63 and 63' respectively. The metallic roof is preferable with permanent installation of the protector and with the fabric roof part 56 beneath it as a lining and packing preventing rapid escape of heated air from the top of the protector. Preferably the metallic roof is provided with a chain 64 connected thereto and to the cab above the base 60, to support the roof when the remaining parts of the protector are removed from the cab.

The flexible sections 33 and 34 preferably are provided with gathering-straps to facilitate the folding of the sections, each section having rings 65 secured to its inner side adjacent to the end part of the protector and similar rings 66 arranged adjacent to the opposite edge of the section, a suitable number of rings 67 being secured to the section between the other two rings; and straps 68 are connected to the rings 65 and arranged in the other rings and provided on their ends with hooks 69 to be brought into connection with the rings 65 when the flexible sections are drawn back so as to provide an opening between the two sections.

In order to adapt the protector to various cab structures an adapter strip 70 is provided for extending the forward end part 7 backward and beyond the face of the cab, the strip being hinged to the part 7, preferably by means of hinges comprising each a hinge plate 71 secured to the outer side of the part 7 and a relatively longer hinge plate 72 secured to the strip and having a vertical slot 73 therein to permit adjustment of the strip in the space found to exist; there being a bolt 74 for each hinge arranged in a suitable bolt hole and extending through the slot, the bolt having a head 75 engaging the face of the plate 72, and a wing-nut 76 on the bolt to secure the parts together. Suitable provision is made for preventing the adapter strip from turning on its hinges, a latch bar 77 preferably being arranged on the bolt under the wing-nut and adapted to swing into a keeper 78 secured to the inner side of the part 7.

In practical use the engineer, in order to increase his range of vision, leans out of the open cab window so that his head is in the protector permitting him to look ahead through the frame part 7 or to look rearward through the part 6 and also look through the windows in the front parts 33 and 34 when found desirable or advantageous. To obtain ventilation the doors in the end parts may be swung open and fastened to the flexible front sections. The front sections may be drawn apart after first disconnecting the hooks 45 therefrom. During inclement weather the engineer is well protected from snow or rain while having a wide range of vision which is needed, especially during switching operations, so that the protector is conducive to the comfort and health of the engineer by protecting his head and body against the ill effects due to wearing wet clothing.

It will be obvious that a knock-down protector may be readily disassembled, the flexible front parts folded between the end parts and the rods packed with them, all being strapped together and readily carried by the engineer when he prefers to remove the protector from the engine.

What is claimed is:

1. A knock-down locomotive cab window protector having two opposite end parts and doors hinged thereto and also a flexible front part and a flexible bottom part removably connected to the end parts, means for removably securing the end parts to the cab, and a separate roof to rest on the tops of the end parts and having means to secure it to the cab.

2. A locomotive cab window protector having a pair of end parts, each part being provided at its rearward edge with means to secure the part to the cab, an upper rod and a lower rod secured to the end parts adjacent to the forward edges thereof, two flexible front parts connected to the rods and having each a window therein, a flexible floor connected with the end parts, and a roof having connection with the end parts and being provided with means to secure the roof to the cab.

3. A locomotive cab window protector including two opposite end parts provided with means to secure the back portions of the parts to the cab, an upper rod and a lower rod rigidly secured to the end parts adjacent to the front portions thereof, two flexible front sections removably connected to the rods and having each a plurality of flexible windows therein, two doors hinged to the end parts respectively adjacent to the front portions thereof and having each a window therein, a flexible bottom part detachably connected to the end parts and to the lower rod and provided with means to secure the bottom part to the cab, and a roof part on the tops of the end parts.

4. In a locomotive cab window protector, the combination of a plurality of end parts having each a slot in its upper back portion, a rod arranged in the slots to support the end parts and having nuts thereon securing the end parts to the rod, a flexible front mounted on the front portions of the end parts, a bottom part and devices to connect it to the lower portions of the end parts, and a roof part to co-operate with the tops of the end parts.

5. In a locomotive cab window protector, the combination of a plurality of end parts having inclined tops and a slot in the lower portion of each top, a rod seated in said slots and having nuts thereon securing the rod to the end parts, a rod secured to the lower portions of the end parts adjacent to the front faces thereof, a pair of flexible front sections connected to the rods, and means to secure the back portions of the end parts to a locomotive cab.

6. In a locomotive cab window protector, the combination of a pair of end parts, two rods secured to the end parts adjacent to the front portions thereof, a pair of flexible front sections loosely connected to the rods and having each a plurality of rings on the back thereof, a strap connected to one and extending through the remaining rings and having a hook on its end, and a flexible bottom part having detachable connections with the front sections and also with the end parts.

7. In a locomotive cab window protector, the combination of a plurality of end parts having each a vertical slot in its lower end, an upper rod secured to its upper front portions of the end parts, means to secure the back portions of the end parts to a cab, a plurality of flexible front sections connected to the upper rod and having loops on their lower ends, and a lower rod arranged in said loops and adjustably in said slots and having nuts thereon to secure the rod rigidly to the end parts.

8. In a locomotive cab window protector, the combination of a plurality of end parts having each a slot in the lower back portion thereof, upper and lower rods secured to the end parts adjacent to the front faces thereof, a plurality of flexible front sections connected to the rods and having ledges on the lower inner portions thereof, a flexible bottom part supported on said ledges and having a loop and also a lip on its back portion, the bottom part having detachable connections with the end parts and the front sections, and a tie rod in said loop and in said slots and having nuts securing it to the end parts.

9. In a locomotive cab window protector, the combination of a rear end part, a forward end part having an adapter strip hinged to its back portion, the strip being shorter than the end part and vertically adjustable on its hinges, means to lock the strip against hinge movements, tie rods secured to the end parts, two flexible front sections connected to the tie rods, a bottom part connected to the end parts and adapted to be connected to the front sections, a roof part to be supported upon the tops of the end parts and adapted to be secured to the cab, and means to secure the end parts to the cab.

In testimony whereof, I affix my signature on the 24th day of January, 1927.

JACOB C. BOYLE.